United States Patent Office 3,176,026
Patented Mar. 30, 1965

3,176,026
1,5-DIOXASPIRO-2,4-HEPTANE AND A METHOD FOR ITS PREPARATION
Erwin Steininger, Frankfurt am Main-Sossenheim, Hesse, Germany, assignor, by mesne assignments, to Socony Mobil Oil Company, Inc., New York, N.Y., a corporation of New York
No Drawing. Filed Dec. 14, 1962, Ser. No. 244,581
12 Claims. (Cl. 260—347.8)

The present invention relates to a novel chemical compound namely 1,5-dioxaspiro-2,4-heptane or 3-methylene-tetrahydrofuranoxide of the following structure:

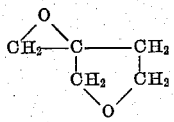

and its synthesis from a 3-hydroxy-3-halomethyl-tetrahydrofuran.

This invention is based on the discovery that, upon treatment with an alkali, a 3-hydroxy-3-halomethyl-tetrahydrofuran can be converted to a compound of the foregoing structural formula by abstraction of hydrogen halide from the 3-hydroxy-3-halomethyl-tetrahydrofuran.

In illustration, the reaction may be carried out according to the following equation using mol ratios of the reactants consisting of sodium tert.-butylate as the alkali and 3-hydroxy-3-chloromethyl tetrahydrofuran.

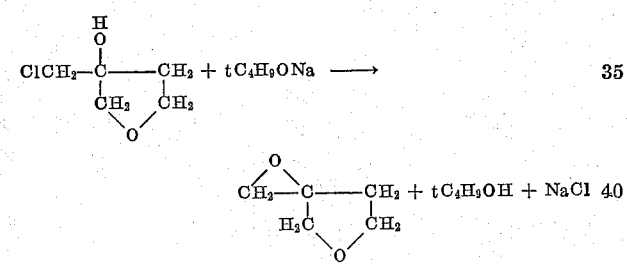

The reaction is preferably carried out in a liquid inert reaction medium, a particular suitable example of which is diethyl ether and, although temperatures other than room temperatures (e.g., about 20° C.) may be used, the reaction proceeds satisfactorily at room temperature (i.e., about 20° C.).

In reference to the tetrahydrofuran reactant, 3-hydroxy-3-chloromethyl tetrahydrofuran is a particularly suitable reactant although corresponding compounds but with a different halogen can be used and, in example, 3-hydroxy-3-bromomethyl tetrahydrofuran, 3-hydroxy-3-iodomethyl tetrahydrofuran, and the like.

For the alkali reactant, alkali metal hydroxides, such as sodium hydroxide and potassium hydroxide and alkali metal alkoxides, such as sodium or potassium alkoxides, and others may be used.

In order to further describe the invention, the following embodiments are set forth for purposes of illustration and not limitation.

EXAMPLE 1

137 grams (one mole) 3-hydroxy-3-chloromethyl tetrahydrofuran in 300 ml. ether was added dropwise with stirring at room temperature to 96 grams (one mole) sodium t-butylate in 300 ml. ether. After stirring for five hours, the mixture was filtered and the filtrate distilled. At 46–48° C. and 14 mm. Hg, 1,5-dioxaspiro-2,4-heptane was obtained in a yield of 83 grams (83% of theory). The compound ($n_D^{20}$ 1.4423) gave the following values upon analysis.

| | Calculated | Found |
|---|---|---|
| $C_5H_8O_2$ Molecular Weight | 100.1 | 97 |
| C percent | 60.0 | 59.7 |
| H do | 8.06 | 7.98 |
| Epoxy Value | 1.0 equivalent/100 g. | 0.98 |

EXAMPLE 2

137 grams (one mole) 3-hydroxy-3-chloromethyl tetrahydrofuran in 300 ml. ether was added dropwise with stirring at room temperature to 40 grams (one mole) sodium hydroxide powder in 300 ml. ether. After stirring for three hours, the mixture was filtered and the filtrate distilled. At 46–47° C. and 14 mm. Hg, 1,5-dioxaspiro-2,4-heptane was obtained in a yield of 79 grams (79% of theory).

The 3-hydroxy-3-halomethyl-tetrahydrofuran used as the reactant for the process embodied herein can be prepared from 4,4-bis-halomethyl metadioxane which in turn can be prepared from a reaction of 3-halo-2-halomethyl propene with an aldehyde. In an example, using the preparation of 3-hydroxy-3-chloromethyl tetrahydrofuran for purposes of illustration, the following procedure may be employed.

A

*Preparation of 4,4-bis-chloromethyl metadioxane*

1250 grams (10 moles) 3-chloro-2-chloromethylpropene 1800 grams (60 moles) paraformaldehyde and 600 grams ethylene chloride were heated with stirring at 90° C. followed by addition of 1100 grams of 80% sulfuric acid. An exothermic reaction occurred that raised the temperature to about 100° C. and remained at that temperature for about two hours, following which the temperature began to drop when the aldehyde completely dissolved. Upon separation of the reaction mixture into two layers, the organic phase was washed twice with water, dried and distilled. The crude product (1850 grams) obtained between 110 and 140° C. at 12 mm. Hg., and containing 65–75% metadioxane, was extracted with two liters of 10% caustic soda solution and dried. By fractional distillation at 12 mm. Hg, the first runnings distilling up to 120° C. were removed. Finally, the product was distilled at 120–122° C. without a column to yield 4,4-bis-chloromethyl-metadioxane (about 98% purity) in an amount of about 1200 grams (65% of theory). Elemental analysis of the product ($n_D^{20}$ 1.4927) gave the following results:

| | Calculated | Found |
|---|---|---|
| Molecular Weight $C_6H_{10}Cl_2O_2$ | 185.1 | 182 |
| C percent | 38.9 | 38.8 |
| H do | 5.44 | 5.49 |
| Cl do | 38.3 | 38.0 |

B

*Preparation of 3-hydroxy-3-chloromethyl tetrahydrofuran*

20 grams 4,4-bis-chloromethyl-metadioxane and 50 grams of 3% sulfuric acid were heated for 3 hours at 150° C. in a tantalum autoclave. Upon cooling, the mixture was treated with ether and distilled. 8.8 grams (59% of theory) of 3-hydroxy-3-chloromethyl-tetrahydrofuran was obtained ($n_D^{20}$ 1.4868; boiling point 109.5° C. at 11 mm. Hg).

Elemental analysis:

|  | Calculated | Found |
|---|---|---|
| $C_5H_9ClO_2$ | 136.6 | 139 |
| C ..........percent | 44.0 | 43.8 |
| H ..............do | 6.64 | 6.60 |
| Cl .............do | 26.0 | 36.3 |

The 1,5-dioxaspiro-2,4-heptane embodied herein is useful as a starting material for building up polymers and, for example, by polymerization involving breakage of the epoxy ring a tetrahydrofuran-substituted polyglycol can be formed that is useful as a solvent, wetting agent, plasticizer, pre-condensate for plastics, or at a sufficiently high degree of polymerization, as a plastic itself or for copolymerization. Presence of the tetrahydrofuran ring also permits crosslinking for prepartion of cross-linked resins.

Although the present invention has been described with preferred embodiments, it is to be understood that modifications and variations may be resorted to, without departing from the spirit and scope of this invention, as those in the art will readily understand. Such variations and modifications are considered to be within the purview and scope of the appended claims.

What is claimed is:

1. 1,5-dioxaspiro-2,4-heptane.
2. A method for synthesis of 1,5-dioxaspiro-2,4-heptane, which comprises reacting a 3-hydroxy-3-halomethyl-tetrahydrofuran with an alkaline reagent that abstracts hydrogen halide from said 3-hydroxy-3-halo-methyltetrahydrofuran.
3. A method, as defined in claim 2, wherein the 3-hydroxy-3-halomethyl tetrahydrofuran is 3-hydroxy-3-chloromethyl-tetrahydrofuran.
4. A method, as defined in claim 2, wherein the alkaline reagent is an alkali metal hydroxide.
5. A method, as defined in claim 2, wherein the alkaline reagent is an alkali metal alkoxide.
6. A method as defined in claim 2, wherein the reaction is carried out in presence of an inert liquid recation medium.
7. A process, as defined in claim 6, wherein the reaction medium is diethylether.
8. A method for preparation of 1,5-dioxaspiro-2,4-heptane which comprises reacting 3-hydroxy-3-chloromethyl tetrahydrofuran with an alkaline reagent that abstracts hydrochloric acid from said 3-hydroxy-3-chloromethyl tetrahydrofuran in the presence of an inert liquid reaction medium to produce 1,5-dioxospiro-2,4-heptane.
9. A process, as defined in claim 8, wherein the inert liquid reaction medium is an ether.
10. A process, as defined in claim 9, wherein the ether is diethyl ether.
11. A method, as defined in claim 8, wherein the alkaline reagent is an alkali metal hydroxide.
12. A method, as defined in claim 8, wherein the alkaline reagent is an alkali metal alkoxide.

No references cited.